Sept. 4, 1934.  B. W. BREWSTER  1,972,288
BRAKE
Filed April 13, 1933  3 Sheets-Sheet 1

INVENTOR
B.W.BREWSTER
By
Hazard & Miller
ATTORNEYS

Sept. 4, 1934. B. W. BREWSTER 1,972,288
BRAKE
Filed April 13, 1933 3 Sheets-Sheet 2

INVENTOR
B W BREWSTER
By
Hazard & Miller
ATTORNEYS

Sept. 4, 1934.  B. W. BREWSTER  1,972,288
BRAKE
Filed April 13, 1933    3 Sheets-Sheet 3

INVENTOR
B. W. BREWSTER
By Hazard & Miller
ATTORNEYS

Patented Sept. 4, 1934

1,972,288

UNITED STATES PATENT OFFICE 1,972,288

BRAKE

Bryan W. Brewster, Fullerton, Calif.

Application April 13, 1933, Serial No. 665,921

6 Claims. (Cl. 188—74)

My invention relates to a brake suitable for a winding and hoisting drum of the draw works of a well drilling or boring equipment.

An object and feature of my invention is an improvement in a segmental brake having a plurality of segments each with a brake lining to engage substantially completely circumferentially the braking surface of the drum when the brake is in the applied position. This action is accomplished by having a plurality of segments which are radially movable by a cam type of action and also slightly circumferentially movable in relation to the braking surface of the brake drum. By my construction, these segments require comparatively little clearance when the segments are withdrawn into an inactive position so that when the segments are forced inwardly they substantially meet at contiguous edges and form a braking surface extending substantially completely circumferentially of the brake surface of the drum.

Another object and feature of my invention is employing a stationary ring in which the brake-applying segments are mounted and providing the ring with a plurality of inwardly extending tapered lugs, a lug engaging between two adjacent brake segments, these lugs having the function of limiting the rotational movement of the brake segments and thus transferring the frictional braking stresses from the segments to the lugs and hence to the fixed ring.

Another feature of my invention consists in the use of circular straps on opposite sides of the brake segments and having a slight rotational movement as regards the fixed ring having the lugs, and such straps operating the cam action of the brake segments.

A further detailed feature of the cam action in actuating the brake segments is providing such segments each with a plurality of slots, each slot extending in a circumferential direction of the segment having such slot and also having a radial component. Through each slot there is a pin which is fixed at opposite ends to the circular straps on opposite sides of the segments so that by partly rotating the straps the pins first move the segments into contact with the lugs and then either force the segments radially inwardly or outwardly in accordance with the direction of rotation of the circular straps in regard to the fixed outer ring.

Another object and feature of my invention is mounting the brake-applying segments, the fixed ring and the circular straps in such relation to the drum that when the drum is unwinding the direction of rotation of such drum tends to apply the brake. Therefore, when the segments are moved in radially a sufficient distance to have the brake lining contact the braking surface of the drum, the rotation of the drum tends to carry the segments in a circumferential direction, which segments, acting with the tapered lugs, and the pins connected to the circular straps tend to force the segments radially inwardly with a greater braking action.

Another and further feature of my invention is constructing my brake as an internal expanding brake in which the segments having the brake lining are forced outwardly by a slight rotation of the circular straps.

My invention is illustrated in the accompanying drawings, in which.

Figure 1:
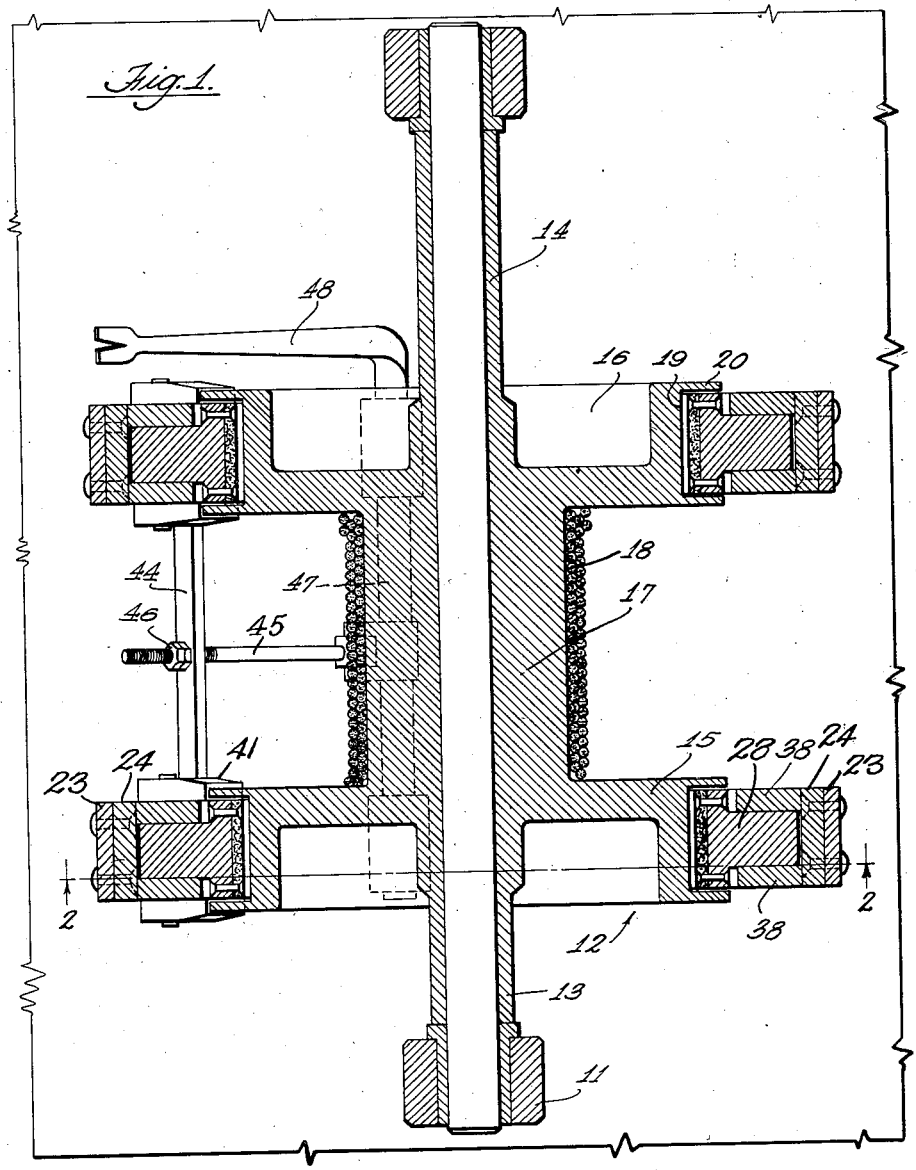
Fig. 1 is a horizontal section on the line 1—1 of Fig. 2 in the direction of the arrows.
Figure 2:
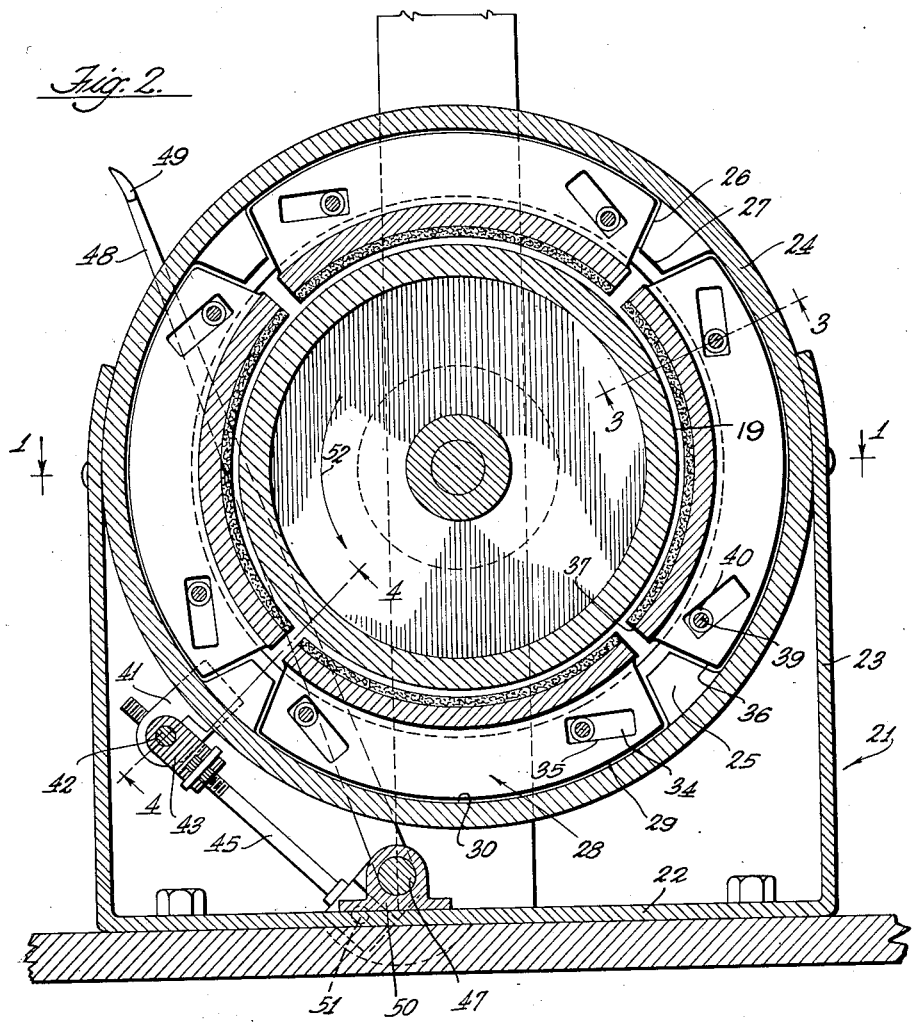
Fig. 2 is a vertical, transverse section on the line 2—2 of Fig. 1 in the direction of the arrows.

My invention illustrates a suitable bearing 11 in which is journaled a hoisting drum assembly, designated by the numeral 12. This is illustrated as having shaft sections 13 and 14, one of which may be driven in any suitable manner. There are two flanged portions 15 and 16 and a cylindrical drum 17 between the flanged sections. On this drum is coiled a cable 18. The flanged sections each have a cylindrical brake surface 19, this being between two marginal rims 20.

Figure 4:
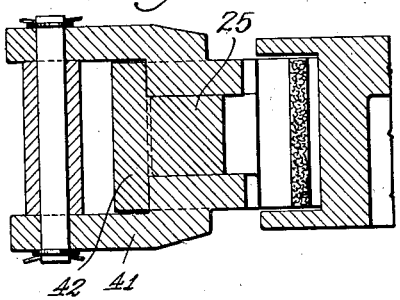
Fig. 4 is a detail longitudinal section on the line 4—4 of Fig. 2 in the direction of the arrows.
Figure 3:
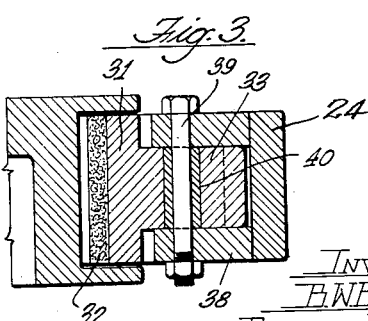
Fig. 3 is a detail longitudinal section on the line 3—3 of Fig. 2 in the direction of the arrows, showing one of the wedging pins and slot.

A supporting frame 21 is illustrated as having a base 22 and two vertical arms 23, to which arms there is secured a ring 24, there being two of these rings, one for each brake surface. The ring has a plurality of wedge-shaped stopping lugs 25 on the inside. These lugs have inwardly sloping surfaces 26 and are, preferably, squared at the inner surface 27. The sloping surface is symmetrical on both sides of the lugs. The width of the lugs is less than the width of the ring 24, as shown in section in Fig. 4.

Fitted inside the ring 24 there are a series of segments 28. Each segment has an outer peripheral surface 29 concentric and closely adjacent to the inner side 30 of the ring 24. The segments are T-shaped in cross section, having a head 31 forming the head of the T. This head is of sufficient width to fit between the marginal rims 20, and the surface is covered with a brake lining 32 of suitable composition. The web 33 is provided with a plurality of guide slots 34, these being arranged so as to have parallel surfaces 35 which extend roughly in the direction of the periphery of the segment and also outwardly radially, thus acting like wedge-shaped cams. The ends 36 of the webs 33, are beveled, this bevel being on the same taper as the surface 26 of the lugs 25. The ends 37 of the T-shaped section of the segments are formed with a radial cut.

A pair of circular straps 38 surround the web section of the segments fitting between the head of the segments and the ring 24. A pin 39 extends between the opposite straps through each of the slots 34, and each pin has a wearing bushing or ring 40 thereon.

In order to partially rotate the circular straps, each of such straps has an extension arm 41 which extends outwardly radially, and the two arms are connected by a pin 42. Each pin is connected by a short link 43 to a crossbar 44, which bar 44 has a link 45 extending therethrough and being held by nuts 46 threaded on the link 45. The manner of exerting a pull on the link 45 is by means of the brake-operating shaft 47, which has an operating lever 48 at one end with a prong 49 for securing this in the desired position. The shaft has a short arm 50 connected thereto and the link 45 is connected to this arm by a pin 51.

In the operation of my invention, the drum, in unwinding, rotates in the direction of the arrow 52. This is the time during which the brakes need to be applied to grip quickly, then on rocking the arm 48 a pull is exerted on the link 45 moving the short radial arms 41 of the side straps 38, which action partially rotates these side straps in the direction of the arrow 52, which is the direction of rotation of the drum. The first action is to bodily move each segment 28 until its beveled end 36 contacts with the beveled surface of the adjacent lug 25, whence the rotational movement of the segment is stopped. Then the two pins 39 in each segment 28 being moved in the cam slot 34 force each segment inwardly until the brake lining contacts with the brake drum surface 19. On account of the segments 28 moving inwardly radially when the brake lining grips the brake section 19 of the drum, it does so in substantially a complete circle. The rotational action of the brake section 19 of the drum tends to pull the segments 28 into closer contact therewith and maintain a high pressure evenly distributed between the segments 28 and the brake sections 19 of the drum.

The brake of my invention may be applied to a large variety of devices requiring a braking action in which there is a cylindrical surface which may be regarded as a brake surface against which the segments 28 may act.

Figure 5:
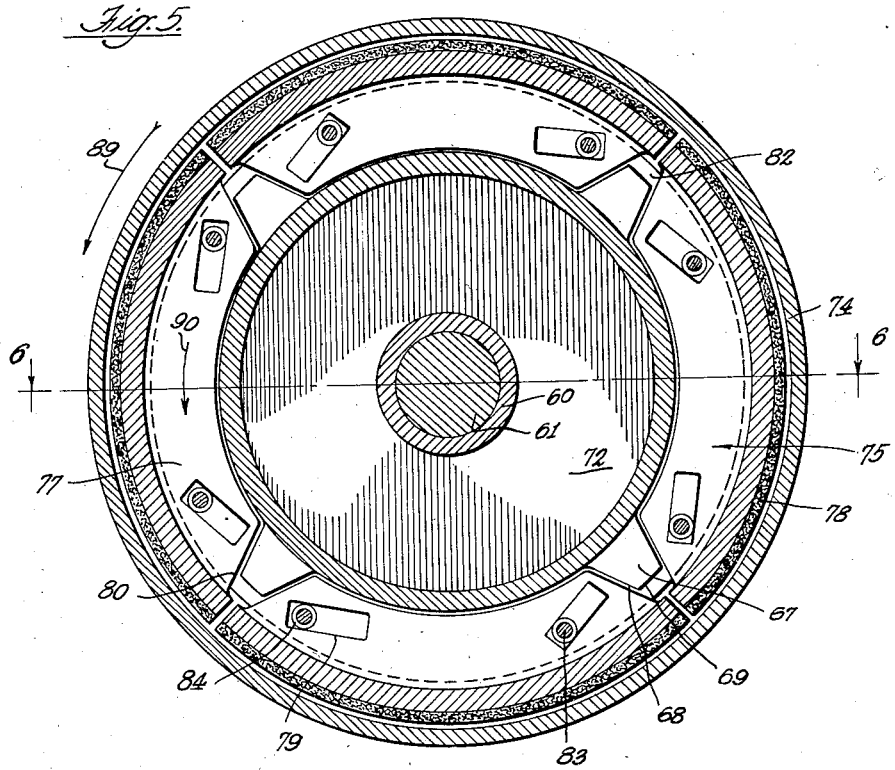
Fig. 5 is a section on the line 5—5 of Figure 6 in the direction of the arrows, showing an internal expanding type of brake.
Figure 6:
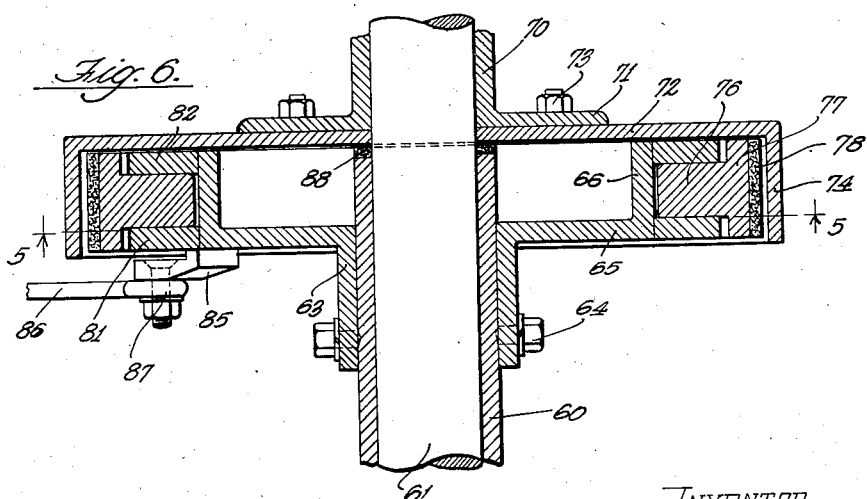
Fig. 6 is a diametrical section on the line 6—6 of Figure 5 in the direction of the arrows.

In the constructions of Figures 5 and 6 I illustrate a shaft or angle housing 60 in which is mounted a rotatable shaft 61. To this housing there is secured a sleeve 63 illustrated as being attached by screws 64. The sleeve has a radial disc 65 to which is attached a ring 66, the ring being cylindrical on its outside surface and parallel to the shaft. A plurality of lugs 67 extend outwardly radially from the ring and have opposite beveled surfaces 68, these forming an outward taper, the taper terminating at the flat surface 69.

A collar 70 is keyed or secured to the shaft in any suitable manner and this has a flange 71 to which is secured the disc 72, the securing means being bolts 73. The disc carries a cylindrical brake drum 74, this being concentric to the shaft and to the ring 66. A plurality of arcuate segments 75 are fitted between the ring and the brake drum intermediate between each pair of lugs. Each segment 75 is T-shaped in cross section having a radial web 76 and a head 77, the head being concentric with the brake drum. The brake lining 78 is attached to the head of each segment section 75. Each segment in addition is provided with a pair of guide and wedging slots 79, these being inclined inwardly. The slots extend through the web section 76. The web 76 of each segment 75 has a beveled edge 80, the bevel conforming to the bevel 68 of the lugs 67.

An outer and an inner circular strap 81 and 82 fit on each side of the web 76 of the segments and each strap has a rotational fit on the ring 66. These circular straps are connected by a series of pins 83, each extending through a slot 79, and each pin having a bushing 84 thereon. The outside strap 81 is illustrated as having an arm 85 connected thereto and to this arm there is attached a link 86 by a pivot bolt 87. A packing washer 88 is fitted on the shaft at the inner end of the shaft housing having a rubbing contact with the rotating disc 72. The brake drum is intended to rotate mainly in the direction of the arrow 89 (Figure 5).

The action of the brake is substantially as follows. The link 86 is operated by any suitable mechanism for applying the brake and in automobiles this may be by connection to the brake pedal. For applying the brakes the arm 85 and straps 81, 82, are given a slight rotation in the direction of the arrow 90. This causes an outward wedging of the segments 75 due to the engagement of the bushings 84 on the pins 83 operative in the wedging guide slots 79. Each segment 75 is limited as to its circumferential movement by one of the lugs 67 and on reaching this limit the segment is forced outwardly in a radial direction, bringing the brake lining into engagement with the internal surface of the brake drum 74, thus applying the brakes. In this action as the brake drum is rotating in the same direction, it tends to drag the segments in the same direction, thus functioning somewhat as a self-energizing brake in which the tighter the segments are wedged against the tapered lugs 67, the greater will be the pressure of the brake lining on the interior of the brake drum. For releasing the brake segments from the brake drum, a reverse rotation is given to the circular straps 81, 82. In this construction it is not convenient to have two operating arms, such as 85, for the circular straps and to have the circular rotating motion communicated from the outside strap to the inside strap through the medium of the pins 83. The action is substantially the reverse of the construction of Figures 1 through 4 except that the brake segments are forced outwardly instead of inwardly.

Various changes may be made in the details of construction without departing from the spirit or scope of the invention as defined by the appended claims.

I claim:

1. A brake having a cylindrical brake drum structure, a ring concentric therewith, the ring having a plurality of radially extending tapered wedge lugs, a plurality of arcuate segments each having a brake lining, each segment being provided with a plurality of wedge slots, a pair of circular straps on opposite sides of the segments and having pins extending through the wedge slots, and means to partly rotate the circular straps.

2. A brake as claimed in claim 1, the ends of each segment having a beveled surface to contact with the beveled or tapering lugs.

3. A brake having a bearing structure with a shaft journaled therein, a cylindrical brake drum structure mounted on the shaft to rotate therewith, a fixed supporting structure having a fixed ring positioned outside of and concentric with the drum structure, a plurality of arcuate segments T-shaped in cross section, each having a web and the head of the T with a brake lining to engage the drum, each web having a plurality of wedging slots inclined inwardly, each segment at opposite ends having a beveled surface on the web, the ring having a plurality of inwardly extending fixed lugs, said lugs having opposite surfaces tapered inwardly radially to conform to the bevel on the ends of the segments, a pair of circular straps fitted adjacent said webs and between the ring and the head of the segments, a pin attached to each strap and extending through one of the slots, means to partly rotate the circular straps to shift each segment into contact with a lug and simultaneously therewith to force each segment inwardly radially.

4. A brake having a bearing structure with a shaft journalled therein, a cylindrical brake drum structure mounted on the shaft to rotate therewith, a fixed supporting structure having a fixed ring positioned outside of and concentric with the brake drum structure, a plurality of arcuate segments each having a brake lining to engage the drum, each segment at opposite ends having a beveled surface, the ring having a plurality of inwardly extending fixed lugs, said lugs having opposite surfaces tapered inwardly radially to conform to the bevel on the ends of the segments, a pair of circular straps fitted adjacent said webs and between the rings and the segments, a pin and slot connection between the straps and the said arcuate segments, said slots having a wedging action with the pins on relative rotation, means to partly rotate the circular straps to shift each segment into contact with the lug and simultaneously therewith to force each segment inwardly radially.

5. A brake having a bearing structure with a shaft journaled therein, a cylindrical brake drum mounted on the shaft to rotate therewith, a fixed ring concentric with the drum, a plurality of lugs on the ring each tapering towards the drum and each forming a wedge, an arcuate segment having a brake lining between each pair of lugs, each segment having its opposite ends beveled complementary to the taper of the lugs, a circular strap on each side of the segments and between the ring and the drum, means to partly rotate the straps, a pin and wedging slot connection between the straps and the segments to partly rotate the segments to force an end of each segment against a lug and to press the segments into braking contact with the drum.

6. A brake having a cylindrical rotatable brake drum, a fixed ring concentric therewith and having a plurality of radially extending wedge lugs tapered towards the drum, an arcuate segment having a brake lining positioned between each pair of lugs, a pair of circular partly rotatable straps on opposite sides of the segments, means to partly rotate said straps, interconnecting means between the straps and segment to partly rotate the segments each into contact with a wedged lug and having a further means to operate with the wedged lugs to force the segments into braking contact with the drum.

BRYAN W. BREWSTER.